United States Patent
Allwardt (10) Patent No.: US 9,616,876 B2
(45) Date of Patent: Apr. 11, 2017

(54) VERIFICATION SYSTEM AND METHOD FOR AN END-OF-TRAIN UNIT OF A TRAIN AND AN IMPROVED END-OF-TRAIN UNIT FOR A TRAIN

(71) Applicant: Westinghouse Air Brake Technologies Corporation, Wilmerding, PA (US)

(72) Inventor: Theodore E. Allwardt, Frederick, MD (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 24 days.

(21) Appl. No.: 14/754,417

(22) Filed: Jun. 29, 2015

(65) Prior Publication Data

US 2016/0375888 A1    Dec. 29, 2016

(51) Int. Cl.
  *G05D 1/00*   (2006.01)
  *B60T 17/22*  (2006.01)

(52) U.S. Cl.
  CPC .......... *B60T 17/228* (2013.01); *B60T 17/221* (2013.01)

(58) Field of Classification Search
  CPC ...... B60T 17/228; B60T 17/221; B60T 13/00; B61L 25/025; B61L 17/00; B61L 25/021; B61L 25/026
  USPC .......... 701/19, 33.2, 34.4; 303/6.1; 340/989; 246/169 R, 167 R, 182 B; 320/162
  See application file for complete search history.

(56) References Cited

U.S. PATENT DOCUMENTS

| | | | |
|---|---|---|---|
| 5,223,207 A | 6/1993 | Gross et al. | |
| 5,642,301 A | 6/1997 | Warrior et al. | |
| 5,680,409 A | 10/1997 | Qin et al. | |
| 5,963,883 A | 10/1999 | Cunkelman et al. | |
| 6,095,618 A | 8/2000 | Heneka et al. | |
| 6,126,247 A | 10/2000 | Paul et al. | |
| 6,189,980 B1* | 2/2001 | Kull ...................... | B60T 17/228 303/15 |
| 6,227,625 B1* | 5/2001 | Gaughan ............... | B60T 13/665 303/15 |
| 6,839,664 B1* | 1/2005 | Kull ...................... | B60T 13/665 303/15 |
| 7,182,411 B2 | 2/2007 | Levy et al. | |
| 7,539,593 B2 | 5/2009 | Machacek | |
| 7,826,954 B2 | 11/2010 | Muramatsu et al. | |
| 8,224,591 B2 | 7/2012 | Smith et al. | |
| 8,346,413 B2 | 1/2013 | Storms et al. | |
| 2002/0153765 A1* | 10/2002 | Levy ..................... | B60T 17/228 303/6.1 |
| 2007/0152107 A1* | 7/2007 | LeFebvre ................ | B61K 9/00 246/169 R |

(Continued)

*Primary Examiner* — Shardul Patel
(74) *Attorney, Agent, or Firm* — The Webb Law Firm (57) ABSTRACT

A verification system for an end-of-train unit for a train having a first pressure sensor for determining the air pressure in a brake pipe, the system including: at least one additional pressure sensor to monitor or sense the air pressure in the brake pipe; and a computer to: receive or determine pressure data from the first pressure sensor; receive or determine pressure data from the at least one additional pressure sensor; compare the pressure data received or determined from the first pressure sensor with the pressure data received or determined from the at least one additional pressure sensor; and implement or facilitate an action based at least partially upon the results of the comparison. An improved end-of-train unit is also disclosed.

25 Claims, 3 Drawing Sheets

(56) References Cited

U.S. PATENT DOCUMENTS

| | | | |
|---|---|---|---|
| 2009/0082987 A1* | 3/2009 | Collins | G01F 25/0007 702/104 |
| 2009/0093920 A1* | 4/2009 | Kane | B61L 15/0027 701/19 |
| 2009/0109013 A1* | 4/2009 | Kane | B61L 23/34 340/466 |
| 2011/0015876 A1* | 1/2011 | Smith | B60T 13/662 702/41 |
| 2011/0095880 A1* | 4/2011 | Gaughan | B60T 17/228 340/453 |
| 2012/0166109 A1* | 6/2012 | Kernwein | B60T 13/665 702/47 |
| 2012/0260716 A1* | 10/2012 | Smith | B60T 17/22 73/1.08 |
| 2014/0081512 A1* | 3/2014 | Fugiel | B60T 7/16 701/33.2 |

* cited by examiner

VERIFICATION SYSTEM AND METHOD FOR AN END-OF-TRAIN UNIT OF A TRAIN AND AN IMPROVED END-OF-TRAIN UNIT FOR A TRAIN

BACKGROUND OF THE INVENTION

Field of the Invention

This invention relates generally to trains and train systems, including trains having an end-of-train unit, and, more specifically, a verification system and method for use in connection with the end-of-train unit of the train, as well as an improved end-of-train unit for a train.

Description of Related Art

As is known in the art, most trains operating within a complex track network include a variety of systems for tracking certain aspects and parameters associated with the train. For example, certain trains are equipped with a Positive Train Control (PTC) system, such as the I-ETMS® of Wabtec Corporation, which allow the train to navigate and operate effectively within the railway system. In addition, most trains include a head-of-train unit and an end-of train unit, and these units are in communication with the train management computer in the PTC segment in the locomotive of the train.

One of the first functions of the end-of-train unit is to report the brake pipe pressure at the rear of the train to the engineer operating the train in the lead locomotive. Because accurate reporting of the end-of-train air pressure is critical, the Federal Railroad Association (FRA) has mandated that the railroads perform a periodic calibration check of the pressure transducer in the end-of-train unit, with the intent of ensuring that the readings are accurate and the transducer has not drifted over time. In particular, the proper functioning of the end-of-train unit is important to ensure that appropriate braking can occur across the railcars of the train.

In current operating procedures, and in order to perform the calibration check, the end-of-train unit is removed from service and sent to a maintenance shop for service. During this time, the end-of-train unit is not available for railroad operations, and the railroad incurs the expense of a calibration check—even if the pressure transducer is operating correctly and providing accurate pressure readings. For example, and in connection with one known railroad system, the estimated total expense associated with the annual calibration check is about $400 per unit, which accounts for the loss of use while the end-of-train unit is in transit. Further, if each end-of-train unit is not calibrated or checked on the periodic basis mandated by the FRA rule, the railroad may be subject to penalties for violating this rule.

Accordingly, there is a need in the art for a verification system and method for an end-of-train unit of a train and an end-of-train unit for a train that allows the unit to monitor the condition of its pressure transducer and dynamically determine when recalibration or maintenance is required. Further, there is a need in the art for a verification system and method for an end-of-train unit of a train and an end-of-train unit for a train that allows the railroads to shift to condition-based service and calibration of the unit, i.e., only performing the calibration and maintenance (or calibration check) when the end-of-train unit actually requires it.

SUMMARY OF THE INVENTION

Generally, the present invention provides an improved verification system and method for an end-of-train unit of a train and an end-of-train unit for a train. Preferably, in some aspects of the present invention, provided are a verification system and method for an end-of-train unit of a train and an end-of-train unit for a train that allow a railroad to implement condition-based maintenance and calibration of the end-of-train unit fleet, rather than servicing the end-of-train units on a set schedule. Preferably, in other aspects of the present invention, provided are a verification system and method for an end-of-train unit of a train and an end-of-train unit for a train that result in a decrease in the railroad's operating expenses and increase the availability of their end-of-train unit fleet.

According to one preferred and non-limiting embodiment or aspect, provided is a verification system for at least one end-of-train unit for a train, wherein the end-of-train unit includes a first pressure sensor configured to monitor or sense the air pressure in a brake pipe in an air brake arrangement of the train. The system includes at least one additional pressure sensor positioned on or in the at least one end-of-train unit, which is configured to monitor or sense the air pressure in the brake pipe in the air brake arrangement of the train. Further, the system includes at least one computer programmed or configured to: (a) receive or determine pressure data from the first pressure sensor, the pressure data comprising air pressure in the brake pipe at or near the end-of-train unit; (b) receive or determine pressure data from the at least one additional pressure sensor, the pressure data comprising air pressure in the brake pipe at or near the end-of-train unit; (c) compare at least a portion of the pressure data received or determined from the first pressure sensor with at least a portion of the pressure data received or determined from the at least one additional pressure sensor; and (d) implement or facilitate at least one action based at least partially upon the results of the comparison.

In one preferred embodiment or aspect, the comparison includes determining variance data comprising the quantitative difference between at least a portion of the pressure data received or determined from the first pressure sensor and at least a portion of the pressure data received or determined from the at least one additional pressure sensor. The at least one action that is implemented or facilitated may be based at least partially on the variance data.

In one preferred embodiment or aspect, based at least partially on the comparison, the at least one action that is implemented or facilitated comprises at least one of the following: (a) logging the status of the end-of-train unit; (b) logging the end-of-train unit as requiring maintenance or service; (c) logging the end-of train unit as not requiring maintenance or service; (d) communicating a message to an on-board computer of the train, the message including an indication of the status of the end-of-train unit; (e) communicating a message to the on-board computer of the train, the message including an indication that the end-of-train unit requires maintenance or service; (f) communicating a message to the on-board computer of the train, the message including an indication that the end-of-train unit does not require maintenance or service; (g) communicating a message to a remote server, the message including an indication of the status of the end-of-train unit; (h) communicating a message to a remote server, the message including an indication that the end-of-train unit requires maintenance or service; (i) communicating a message to a remote server, the message including an indication that the end-of-train unit does not require maintenance or service; or any combination thereof. At least one of the logging and communication may occur at a specified rate. The specified rate may be at least one of the following: periodic, continual, dynamic, configurable, condition based, at a rate determined by a regulation or standard, or any combination thereof. The maintenance or service required may be at least one of the following: a calibration of the first pressure sensor, a calibration of the at least one additional pressure sensor, a replacement of the first pressure sensor, a replacement of the at least one additional pressure sensor, a check of the first pressure sensor, a check of the at least one additional pressure sensor, or any combination thereof.

In one preferred embodiment or aspect, the first pressure sensor and the at least one additional pressure sensor are provided or manufactured by a different manufacturer. In one preferred embodiment or aspect, the first pressure sensor and the at least one additional pressure sensor use a different technology to determine the pressure data. In one preferred embodiment or aspect, the first pressure sensor and the at least one additional pressure sensor are configured to have different responsive or reactive characteristics with respect to at least one of the following: temperature, age, vibration, or any combination thereof.

In one preferred embodiment or aspect, the at least one additional pressure sensor comprises a plurality of additional pressure sensors. The at least one action that is implemented or facilitated may be at least partially based upon a comparison of at least a portion of the pressure data from all of, a set of, and/or specified pressure sensors. Identification of the set of or the specified pressure sensors is at least one of the following: configurable, automated, manually input, dynamic, or any combination thereof. Each of the first pressure sensor and the plurality of additional pressure sensors may be provided or manufactured by a different manufacturer. Each of the first pressure sensor and the plurality of additional pressure sensors may use a different technology to determine the pressure data. Each of the first pressure sensor and the plurality of additional pressure sensors may be configured to have different responsive or reactive characteristics with respect to at least one of the following: temperature, age, vibration, or any combination thereof.

In one preferred embodiment or aspect, the air pressure in the brake pipe at or near the end-of-train unit is determined based at least partially on the pressure data from the first pressure sensor and the at least one additional pressure sensor. The at least one computer may be located on or in the at least one end-of-train unit, and wherein at least a portion of the pressure data is communicated to at least one of an on-board computer of the train and a remote server.

In one preferred embodiment or aspect, the at least one action that is implemented or facilitated comprises communication of at least a portion of the pressure data, or information derived from at least a portion of the pressure data, to at least one of the following: an on-board computer, an on-board controller, a train management computer, a remote server, a back office server, central dispatch, or any combination thereof, over at least one of the following: a wireless network, rails of a track, a railroad network, a cellular network, a Bluetooth network, a near-field network, a radio network, a portable storage device, or any combination thereof.

In one preferred embodiment or aspect, the system further includes populating a database with at least one of the following: pressure data, variance data, end-of-train unit data, maintenance or service data, calibration data, replacement data, scheduling data, compliance data, railroad data, Federal Railroad Association data, or any combination thereof.

In one preferred embodiment or aspect, the pressure data comprises preventative maintenance data comprising at least one of the following: drift data, trend data, limit data, tolerance data, comparison data, or any combination thereof. At least partially based upon at least a portion of the preventative maintenance data, the at least one action that is implemented or facilitated may be at least one of the following: (a) logging the status of the end-of-train unit; (b) logging the end-of-train unit as requiring preventative maintenance or service; (c) logging the end-of-train unit as not requiring preventative maintenance or service; (d) communicating a message to an on-board computer of the train, the message including an indication of the status of the end-of-train unit; (e) communicating a message to the on-board computer of the train, the message including an indication that the end-of-train unit requires preventative maintenance or service; (f) communicating a message to the on-board computer of the train, the message including an indication that the end-of-train unit does not require preventative maintenance or service; (g) communicating a message to a remote server, the message including an indication of the status of the end-of-train unit; (h) communicating a message to a remote server, the message including an indication that the end-of-train unit requires preventative maintenance or service; (i) communicating a message to a remote server, the message including an indication that the end-of-train unit does not require preventative maintenance or service; or any combination thereof.

In one preferred embodiment or aspect, the at least one computer is further programmed or configured to generate prediction data based at least partially at least a portion of the results of the comparison. The prediction data may include a prediction of when the first pressure sensor and/or the at least one second pressure sensor will require maintenance.

In another preferred and non-limiting embodiment or aspect, provided is a computer-implemented or facilitated verification method for at least one end-of-train unit for a train, wherein the end-of-train unit includes a first pressure sensor configured to monitor or sense the air pressure in a brake pipe in an air brake arrangement of the train. The method includes: providing at least one additional pressure sensor positioned on or in the at least one end-of-train unit; monitoring or sensing, by the at least one additional pressure sensor, the air pressure in the brake pipe in the air brake arrangement of the train; receiving pressure data from the first pressure sensor, the pressure data comprising air pressure in the brake pipe at or near the end-of-train unit; receiving pressure data from the at least one additional pressure sensor, the pressure data comprising air pressure in the brake pipe at or near the end-of-train unit; comparing at least a portion of the pressure data received or determined from the first pressure sensor with at least a portion of the pressure data received or determined from the at least one additional pressure sensor; and implementing or facilitating at least one action based at least partially upon the results of the comparison.

In a further preferred and non-limiting embodiment or aspect, provided is an end-of-train unit for a train, including: a first pressure sensor configured to monitor or sense the air pressure in a brake pipe in an air brake arrangement of the train; and at least one additional pressure sensor configured to monitor or sense the air pressure in the brake pipe in the air brake arrangement of the train. The pressure data from the first pressure sensor and the at least one additional pressure sensor is compared, and based at least partially on this comparison, at least one maintenance-related action is implemented or facilitated.

Further embodiments or aspects are set forth in the following numbered clauses:

Clause 1: A verification system for at least one end-of-train unit for a train, wherein the end-of-train unit comprises a first pressure sensor configured to monitor or sense the air pressure in a brake pipe in an air brake arrangement of the train, the system comprising: at least one additional pressure sensor positioned on or in the at least one end-of-train unit and configured to monitor or sense the air pressure in the brake pipe in the air brake arrangement of the train; and at least one computer programmed or configured to: (a) receive or determine pressure data from the first pressure sensor, the pressure data comprising air pressure in the brake pipe at or near the end-of-train unit; (b) receive or determine pressure data from the at least one additional pressure sensor, the pressure data comprising air pressure in the brake pipe at or near the end-of-train unit; (c) compare at least a portion of the pressure data received or determined from the first pressure sensor with at least a portion of the pressure data received or determined from the at least one additional pressure sensor; and (d) implement or facilitate at least one action based at least partially upon the results of the comparison.

Clause 2: The verification system of clause 1, wherein the comparison includes determining variance data comprising the quantitative difference between at least a portion of the pressure data received or determined from the first pressure sensor and at least a portion of the pressure data received or determined from the at least one additional pressure sensor.

Clause 3: The verification system of clause 2, wherein the at least one action that is implemented or facilitated is based at least partially on the variance data.

Clause 4: The verification system of any of clauses 1-3, wherein, based at least partially on the comparison, the at least one action that is implemented or facilitated comprises at least one of the following: (a) logging the status of the end-of-train unit; (b) logging the end-of-train unit as requiring maintenance or service; (c) logging the end-of train unit as not requiring maintenance or service; (d) communicating a message to an on-board computer of the train, the message including an indication of the status of the end-of-train unit; (e) communicating a message to the on-board computer of the train, the message including an indication that the end-of-train unit requires maintenance or service; (h) communicating a message to the on-board computer of the train, the message including an indication that the end-of-train unit does not require maintenance or service; (g) communicating a message to a remote server, the message including an indication of the status of the end-of-train unit; (h) communicating a message to a remote server, the message including an indication that the end-of-train unit requires maintenance or service; (i) communicating a message to a remote server, the message including an indication that the end-of-train unit does not require maintenance or service; or any combination thereof.

Clause 5: The verification system of clause 4, wherein at least one of the logging and communication occurs at a specified rate.

Clause 6: The verification system of clause 5, wherein the specified rate is at least one of the following: periodic, continual, dynamic, configurable, condition based, at a rate determined by a regulation or standard, or any combination thereof.

Clause 7: The verification system of clauses 5 or 6, wherein the maintenance or service required is at least one of the following: a calibration of the first pressure sensor, a calibration of the at least one additional pressure sensor, a replacement of the first pressure sensor, a replacement of the at least one additional pressure sensor, a check of the first pressure sensor, a check of the at least one additional pressure sensor, or any combination thereof.

Clause 8: The verification system of any of clauses 1-7, wherein the first pressure sensor and the at least one additional pressure sensor are provided or manufactured by a different manufacturer.

Clause 9: The verification system of any of clauses 1-8, wherein the first pressure sensor and the at least one additional pressure sensor use a different technology to determine the pressure data.

Clause 10: The verification system of any of clauses 1-9, wherein the first pressure sensor and the at least one additional pressure sensor are configured to have different responsive or reactive characteristics with respect to at least one of the following: temperature, age, vibration, or any combination thereof.

Clause 11: The verification system of any of clauses 1-10, wherein the at least one additional pressure sensor comprises a plurality of additional pressure sensors.

Clause 12: The verification system of clause 11, wherein the at least one action that is implemented or facilitated is at least partially based upon a comparison of at least a portion of the pressure data from all of, a set of, and/or specified pressure sensors.

Clause 13: The verification system of clause 12, wherein identification of the set of or the specified pressure sensors is at least one of the following: configurable, automated, manually input, dynamic, or any combination thereof.

Clause 14: The verification system of any of clauses 11-13, wherein each of the first pressure sensor and the plurality of additional pressure sensors are provided or manufactured by a different manufacturer.

Clause 15: The verification system of any of clauses 11-14, wherein each of the first pressure sensor and the plurality of additional pressure sensors use a different technology to determine the pressure data.

Clause 16: The verification system of any of clauses 11-15, wherein each of the first pressure sensor and the plurality of additional pressure sensors are configured to have different responsive or reactive characteristics with respect to at least one of the following: temperature, age, vibration, or any combination thereof.

Clause 17: The verification system of any of clauses 1-16, wherein the air pressure in the brake pipe at or near the end-of-train unit is determined based at least partially on the pressure data from the first pressure sensor and the at least one additional pressure sensor.

Clause 18: The verification system of clause 17, wherein the at least one computer is located on or in the at least one end-of-train unit, and wherein the at least a portion of the pressure data is communicated to at least one of an on-board computer of the train and a remote server.

Clause 19: The verification system of any of clauses 1-18, wherein the at least one action that is implemented or facilitated comprises communication of at least a portion of the pressure data, or information derived from at least a portion of the pressure data, to at least one of the following: an on-board computer, an on-board controller, a train management computer, a remote server, a back office server, central dispatch, or any combination thereof, over at least one of the following: a wireless network, rails of a track, a railroad network, a cellular network, a Bluetooth network, a near-field network, a radio network, a portable storage device, or any combination thereof.

Clause 20: The verification system of any of clauses 1-19, further comprising populating a database with at least one of the following: pressure data, variance data, end-of-train unit data, maintenance or service data, calibration data, replacement data, scheduling data, compliance data, railroad data, Federal Railroad Association data, or any combination thereof.

Clause 21: The verification system of any of clauses 1-20, wherein the pressure data comprises preventative maintenance data comprising at least one of the following: drift data, trend data, limit data, tolerance data, comparison data, or any combination thereof.

Clause 22: The verification system of clause 21, wherein, at least partially based upon at least a portion of the preventative maintenance data, the at least one action that is implemented or facilitated comprises at least one of the following: (a) logging the status of the end-of-train unit; (b) logging the end-of-train unit as requiring preventative maintenance or service; (c) logging the end-of-train unit as not requiring preventative maintenance or service; (d) communicating a message to an on-board computer of the train, the message including an indication of the status of the end-of-train unit; (e) communicating a message to the on-board computer of the train, the message including an indication that the end-of-train unit requires preventative maintenance or service; (f) communicating a message to the on-board computer of the train, the message including an indication that the end-of-train unit does not require preventative maintenance or service; (g) communicating a message to a remote server, the message including an indication of the status of the end-of-train unit; (h) communicating a message to a remote server, the message including an indication that the end-of-train unit requires preventative maintenance or service; (i) communicating a message to a remote server, the message including an indication that the end-of-train unit does not require preventative maintenance or service; or any combination thereof.

Clause 23: The verification system of any of clauses 1-22, wherein the at least one computer is further programmed or configured to generate prediction data based at least partially at least a portion of the results of the comparison.

Clause 24: The verification system of clause 23, wherein the prediction data comprises a prediction of when the first pressure sensor and/or the at least one second pressure sensor will require maintenance. These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PREFERRED EMBODIMENTS

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible. Any known electronic communication protocols and/or algorithms may be used such as, for example, TCP/IP (including HTTP and other protocols), WLAN (including 802.11 and other radio frequency-based protocols and methods), analog transmissions, and/or the like.

The terms "end-of-train unit" and "EOT", as used interchangeably herein, may refer to any unit that is positioned on or near the rear of a train (TR), where this unit is equipped with a pressure transducer or sensor operable to sense the air pressure in the air pipe (of the air brake system) at or near the end of the train (TR). The end-of-train unit may include one or more hardware and/or software components in communication with one or more components and/or systems of a train (TR) or railway such as, but not limited to, an on-board computer 10, a train management computer, a head-of-train unit, another end-of-train unit, wayside equipment, operator interfaces and/or other like systems and components.

The present invention, including the various computer-implemented and/or computer-designed aspects, methods, processes, and configurations, may be implemented on a variety of computing devices and systems, including the client devices and/or server computer, wherein these computing devices include the appropriate processing mechanisms and computer-readable media for storing and executing computer-readable instructions, such as programming instructions, code, and/or the like. In addition, aspects of this invention may be implemented on existing controllers, control systems, and computers integrated or associated with, or positioned on, a locomotive (L), any of the railcars (RC), and/or any of the components associated with the train (TR), e.g., the end-of-train unit, the head-of-train unit, the on-board computer 10, and/or the like. For example, the presently-invented system or any of its functional components can be implemented wholly or partially on a train management computer, a Positive Train Control computer, an on-board controller or computer, a railcar computer, a train component computer, e.g., a computer associated with and/or positioned on an end-of-train unit, a head-of-train unit, etc., and/or the like. In addition, the presently-invented systems and methods may be implemented in a laboratory environment in one or more computers or servers. Still further, the functions and computer-implemented features of the present invention may be in the form of software, firmware, hardware, programmed control systems, microprocessors, and/or the like.

Figure 1:
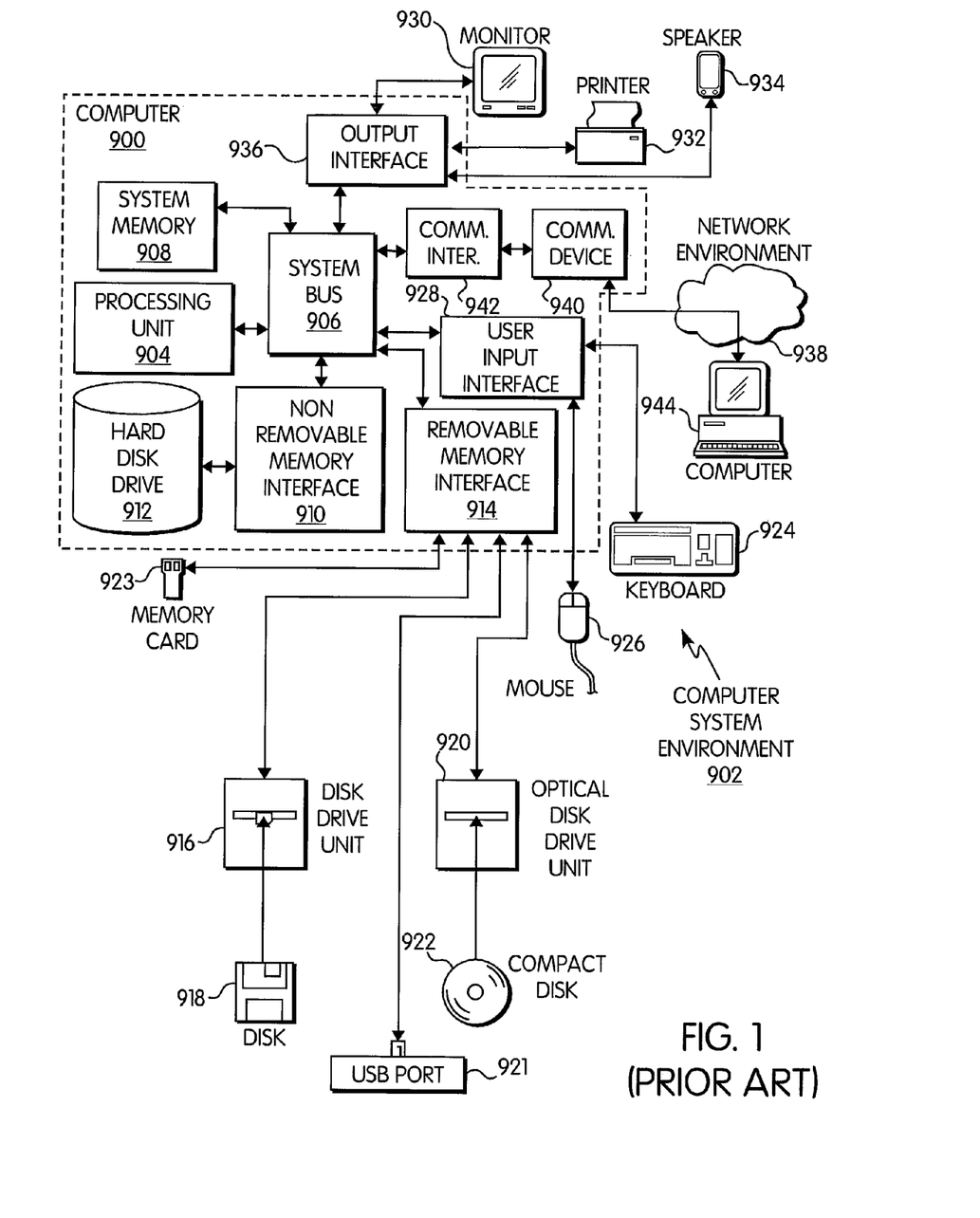
FIG. 1 is a schematic diagram of a computer and network infrastructure according to the prior art.

As shown in FIG. 1, and according to the prior art, computers 900, 944, in a computing system environment 902 may be provided or utilized. This computing system environment 902 may include, but is not limited to, at least one computer 900 having certain components for appropriate operation, execution of code, and creation and communication of data. For example, the computer 900 includes a processing unit 904 (typically referred to as a central processing unit or CPU) that serves to execute computer-based instructions received in the appropriate data form and format. Further, this processing unit 904 may be in the form of multiple processors executing code in series, in parallel, or in any other manner for appropriate implementation of the computer-based instructions.

In order to facilitate appropriate data communication and processing information between the various components of the computer 900, a system bus 906 is utilized. The system bus 906 may be any of several types of bus structures, including a memory bus or memory controller, a peripheral bus, or a local bus using any of a variety of bus architectures. In particular, the system bus 906 facilitates data and information communication between the various components (whether internal or external to the computer 900) through a variety of interfaces, as discussed hereinafter.

The computer 900 may include a variety of discrete computer-readable media components. For example, this computer-readable media may include any media that can be accessed by the computer 900, such as volatile media, non-volatile media, removable media, non-removable media, etc. As a further example, this computer-readable media may include computer storage media, such as media implemented in any method or technology for storage of information, such as computer-readable instructions, data structures, program modules, or other data, random access memory (RAM), read only memory (ROM), electrically erasable programmable read only memory (EEPROM), flash memory, or other memory technology, CD-ROM, digital versatile disks (DVDs), or other optical disk storage, magnetic cassettes, magnetic tape, magnetic disk storage, or other magnetic storage devices, or any other medium which can be used to store the desired information and which can be accessed by the computer 900. Further, this computer-readable media may include communications media, such as computer-readable instructions, data structures, program modules, or other data in other transport mechanisms and include any information delivery media, wired media (such as a wired network and a direct-wired connection), and wireless media. Computer-readable media may include all machine-readable media with the sole exception of transitory, propagating signals. Of course, combinations of any of the above should also be included within the scope of computer-readable media.

As seen in FIG. 1, the computer 900 further includes a system memory 908 with computer storage media in the form of volatile and non-volatile memory, such as ROM and RAM. A basic input/output system (BIOS) with appropriate computer-based routines assists in transferring information between components within the computer 900 and is normally stored in ROM. The RAM portion of the system memory 908 typically contains data and program modules that are immediately accessible to or presently being operated on by processing unit 904, e.g., an operating system, application programming interfaces, application programs, program modules, program data and other instruction-based computer-readable codes.

With continued reference to FIG. 1, the computer 900 may also include other removable or non-removable, volatile or non-volatile computer storage media products. For example, the computer 900 may include a non-removable memory interface 910 that communicates with and controls a hard disk drive 912, i.e., a non-removable, non-volatile magnetic medium; and a removable, non-volatile memory interface 914 that communicates with and controls a magnetic disk drive unit 916 (which reads from and writes to a removable, non-volatile magnetic disk 918), an optical disk drive unit 920 (which reads from and writes to a removable, non-volatile optical disk 922, such as a CD ROM), a Universal Serial Bus (USB) port 921 for use in connection with a removable memory card, etc. However, it is envisioned that other removable or non-removable, volatile or non-volatile computer storage media can be used in the exemplary computing system environment 900, including, but not limited to, magnetic tape cassettes, DVDs, digital video tape, solid state RAM, solid state ROM, etc. These various removable or non-removable, volatile or non-volatile magnetic media are in communication with the processing unit 904 and other components of the computer 900 via the system bus 906. The drives and their associated computer storage media discussed above and illustrated in FIG. 1 provide storage of operating systems, computer-readable instructions, application programs, data structures, program modules, program data and other instruction-based computer-readable code for the computer 900 (whether duplicative or not of this information and data in the system memory 908).

A user may enter commands, information, and data into the computer 900 through certain attachable or operable input devices, such as a keyboard 924, a mouse 926, etc., via a user input interface 928. Of course, a variety of such input devices may be utilized, e.g., a microphone, a trackball, a joystick, a touchpad, a touch-screen, a scanner, etc., including any arrangement that facilitates the input of data, and information to the computer 900 from an outside source. As discussed, these and other input devices are often connected to the processing unit 904 through the user input interface 928 coupled to the system bus 906, but may be connected by other interface and bus structures, such as a parallel port, game port, or a universal serial bus (USB). Still further, data and information can be presented or provided to a user in an intelligible form or format through certain output devices, such as a monitor 930 (to visually display this information and data in electronic form), a printer 932 (to physically display this information and data in print form), a speaker 934 (to audibly present this information and data in audible form), etc. All of these devices are in communication with the computer 900 through an output interface 936 coupled to the system bus 906. It is envisioned that any such peripheral output devices be used to provide information and data to the user.

The computer 900 may operate in a network environment 938 through the use of a communications device 940, which is integral to the computer or remote therefrom. This communications device 940 is operable by and in communication to the other components of the computer 900 through a communications interface 942. Using such an arrangement, the computer 900 may connect with or otherwise communicate with one or more remote computers, such as a remote computer 944, which may be a personal computer, a server, a router, a network personal computer, a peer device, or other common network nodes, and typically includes many or all of the components described above in connection with the computer 900. Using appropriate communication devices 940, e.g., a modem, a network interface or adapter, etc., the computer 900 may operate within and communication through a local area network (LAN) and a wide area network (WAN), but may also include other networks such as a virtual private network (VPN), an office network, an enterprise network, an intranet, the Internet, etc. It will be appreciated that the network connections shown are exemplary and other means of establishing a communications link between the computers 900, 944 may be used.

As used herein, the computer 900 includes or is operable to execute appropriate custom-designed or conventional software to perform and implement the processing steps of the method and system of the present invention, thereby, forming a specialized and particular computing system. Accordingly, the presently-invented method and system may include one or more computers 900 or similar computing devices having a computer-readable storage medium capable of storing computer-readable program code or instructions that cause the processing unit 904 to execute, configure or otherwise implement the methods, processes, and transformational data manipulations discussed hereinafter in connection with the present invention. Still further, the computer 900 may be in the form of any type of computing device having the necessary processing hardware to appropriately process data to effectively implement the presently-invented computer-implemented method and system.

Figure 2:
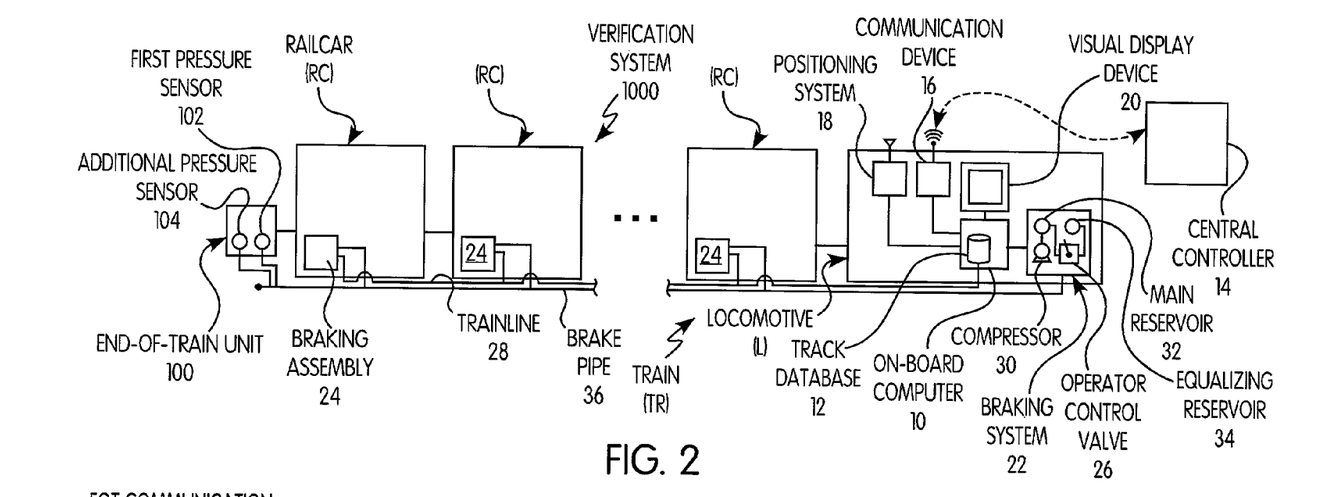
FIG. 2 is a schematic view of one embodiment or aspect of a verification system for an end-of-train unit for a train according to the principles of the present invention.

The computer-implemented method and system may be implemented in a variety of systems and vehicular networks; however, the methods and systems described herein are particularly useful in connection with a railway system and network. Accordingly, the presently-invented methods and systems can be implemented in various known train control and management systems, e.g., the above-referenced I-ETMS® of Wabtec Corp. In one preferred and non-limiting embodiment or aspect, and as illustrated in FIG. 2, the systems and methods described herein may be implemented on or in connection with a train (TR) with at least one locomotive (L) having an on-board computer 10, which may be located at any position or orientation on the train (TR). The on-board computer 10 (or on-board controller, on-board computer system, train management computer, and/or the like, and which performs the calculations for the Positive Train Control (PTC) system) includes a track database 12 populated with data and/or which receives specified data and information from other trains (TR), central controllers 14 (e.g., remote servers, back office servers, central dispatch, back office PTC components, and/or the like), or other devices or systems (e.g., end-of-train units, head-of-train units, wayside device, and/or the like).

In one preferred and non-limiting embodiment or aspect, the on-board computer 10 receives real-time inputs from various locomotive control settings or components, including a positioning (or navigation) system 18, e.g., a GPS receiver, at least one wheel tachometer/speed sensor, and/or the like. Further, the on-board computer 10 includes or is in communication with a communication device 16 (e.g., a data radio, a communication interface, a communication component, and/or the like), which facilitates communication by or between locomotives (L) and/or the locomotive (L) and some remote server or computer system (e.g., the central controller 14, a back office server, a remote server, central dispatch, back office PTC components, the end-of-train unit, the head-of-train unit, various wayside devices, such as signal or switch monitors, or other on-board computers 10 in the railway system). Further, this communication may occur wirelessly or in a "hard wired" form, e.g., over the rails of the track. In another preferred and non-limiting embodiment or aspect, the on-board computer 10 includes or is communication with a visual display device 20, such as the operator's display in the cab of the locomotive (L). This visual display device 20 is used to present information and data to the operator of the train (TR). Accordingly, the presently-invented system and methods can be effectively implemented and used by or on such a locomotive (L) having such an on-board computer 10 and associated components. Of course, it is envisioned that any type of train management system can be used within the context and scope of the present invention.

As is known, braking systems and arrangements are required for slowing and stopping vehicles, such as cars, trucks, trains, railcars, railway vehicles, and the like. With specific respect to trains and other railway vehicles, the braking system is normally in the form of a pneumatically-driven arrangement (or "air brake arrangement"), which includes mechanisms and components that interact with each railcar. As discussed hereinafter, certain components (i.e., a braking system 22) of an air brake arrangement are positioned on or in, or otherwise associated with the locomotive (L). Similarly, certain components (i.e., a braking assembly 24) of the air brake arrangement are positioned on or in, or otherwise associated with locomotive (L), as well as one or more of the individual railcars (RC).

With continued reference to FIG. 2, and in one preferred and non-limiting, the operator of the train (TR) has control over the air brake arrangement, such as each braking assembly 24 on each railcar (RC), through the use of an operator control valve 26. Through the movement of a handle associated with the control valve 26, the operator can adjust the amount of braking to be applied in the air brake arrangement, such as in each braking assembly 24. The higher the braking force selected, the faster the air brake arrangement will attempt to slow and stop the train (TR). Alternatively, and as discussed in more detail hereinafter, the air brake arrangement and/or each braking assembly 24 for each railcar (RC) may also be controlled by the operator from the on-board computer 10 that transmits data signals, typically over a trainline 28 (or cable extending between the locomotive (L) and the railcars (RC)), which may be referred to as an electronically-controlled pneumatic (ECP) air brake arrangement.

In order to provide the appropriately compressed air to the system, and in certain conventional air brake applications, the braking system 22 also includes a compressor 30 for providing compressed air to a main reservoir 32, which is in communication with the control valve 26. Further, an equalizing reservoir 34 is also in communication with the control valve 26. Whether through the main reservoir 32 or the equalizing reservoir 34, compressed air is supplied through the control valve 26 to a brake pipe 36 that extends along and is associated with each railcar (RC). Each railcar (RC) includes a braking assembly or unit 26, which represents an arrangement that allows an auxiliary reservoir to be charged with air via a valve, as well as including a brake cylinder, which is in communication with the valve. The brake cylinder is operable to urge a brake shoe mechanism against a surface of a wheel.

In operation, the brake pipe 36 is continually charged to maintain a specific pressure, e.g., 90 psi, and each auxiliary reservoir and emergency reservoir (which may be combined into a single volume, or main reservoir) are similarly charged from the brake pipe 36. In order to brake the train (TR), the operator actuates the control valve 26 and removes air from the brake pipe 36, thereby reducing pressure to a lower level, e.g., 80 psi. The valve arrangement quits charging the auxiliary reservoir and transfers air from the auxiliary reservoir to the brake cylinder. Normally using a piston-operable arrangement, the brake cylinder urges the brake shoe mechanism against the wheel. As discussed, in conventional, non-ECP air brake systems, the operator may adjust the level of braking using the control valve 26, since the amount of pressure removed from the brake pipe 36 results in a specific pressure in the brake cylinder, which results in a specific application force of the brake shoe mechanism against the wheel. Alternatively, in the ECP air brake arrangement, the brake commands are electronic signals transmitted over the ECP trainline 28 to each railcar (RC), and based upon commands from the on-board computer 10.

As discussed, and in connection with ECP brake arrangements, control signals can be transmitted from the on-board computer 10 to one or more of the railcars (RC) over the trainline 28. Each railcar (RC) is normally equipped with a local controller, which is used to monitor and/or control certain operating parameters in the air brake arrangement, such as the air reservoirs and/or the valve arrangement. In this manner, the operator can broadcast brake commands to the railcars (RC) to ensure a smooth, efficient, and effective braking operation.

Figure 3:
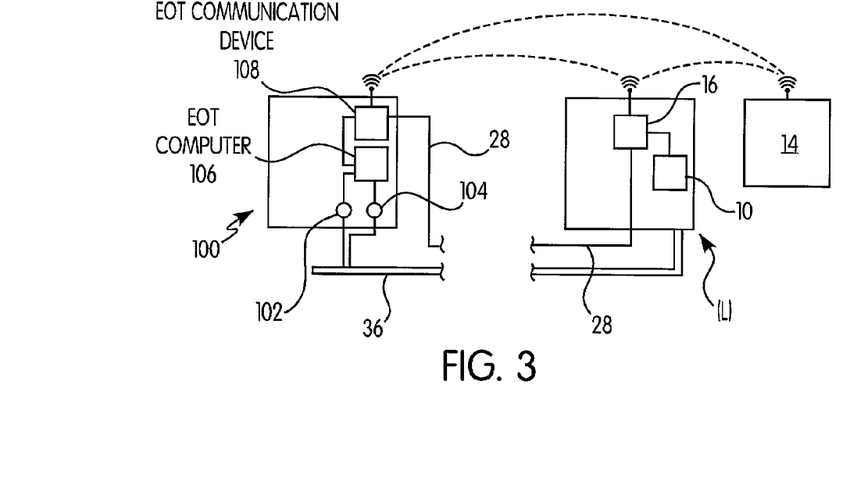
FIG. 3 is a schematic view of another embodiment or aspect of a verification system for an end-of-train unit for a train according to the principles of the present invention.
Figure 4:
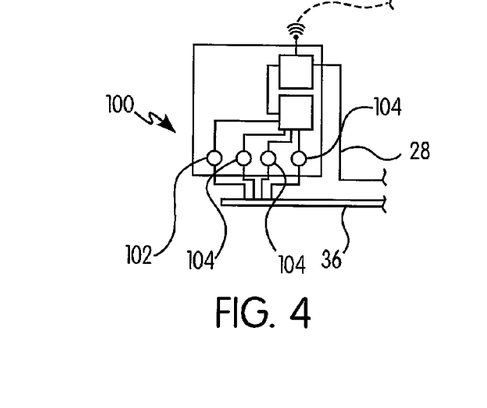
FIG. 4 is a schematic view of one embodiment or aspect of an improved end-of-train unit according to the principles of the present invention.

The present invention is directed to a verification system 1000 for an end-of-train unit of a train (TR), as well as an improved end-of-train unit 100, as illustrated in schematic form in various preferred and non-limiting embodiments or aspects in FIGS. 2-4. In addition, the present invention is directed to a computer-implemented or—facilitated verification method 200 for use in connection with an end-of-train unit for a train, as illustrated in flow diagram form in one preferred and non-limiting embodiment or aspect in FIG. 5.

With specific reference to FIG. 2, and in one preferred and non-limiting embodiment or aspect, provided is a verification system 1000 for an end-of-train (EOT) unit 100 of a train (TR). The verification system 1000 includes a first pressure sensor 102 positioned on or in (or associated with) the EOT unit 100, and this first pressure sensor 102 is configured or operable to monitor or sense the pressure, e.g., the air pressure, in the brake pipe 36 in the air brake arrangement (e.g., the braking system 22, the braking assemblies 24, and/or other components in the air brake arrangement of the train (TR)). In addition, provided is at least one additional pressure sensor 104 (which may be in the form of or include multiple additional pressure sensors 104, e.g., the first pressure sensor 102 and two additional pressure sensors 104), which is positioned on or in (or associated with) the end-of-train unit 100. Like the first pressure sensor 102, the at least one (and, as discussed in more detail hereinafter, potentially multiple) additional pressure sensor 104 is configured or operable to monitor or sense the pressure, e.g., the air pressure, in the brake pipe 36 in the air brake arrangement of the train (TR). In one preferred and non-limiting embodiment or aspect, the first pressure sensor 102 and the at least one additional pressure sensor 104 are positioned or operable to monitor or sense the pressure in substantially the same area or portion of the brake pipe 26; while, in another preferred and non-limiting embodiment or aspect, the first pressure sensor 102 and the at least one additional pressure sensor 104 are positioned or operable to monitor or sense the pressure in different, spaced, configured, aligned, and/or discrete areas or portions of the brake pipe 26 at or near the EOT unit 100 and/or the last railcar (RC) of the train (TR).

In this embodiment or aspect, provided is one or more computers or computing devices or systems that are configured, adapted or programmed to implement or facilitate certain functions (as described hereinafter). This computer may be the on-board computer 10, the central controller 14, an EOT computer (operable as a local controller or computer positioned on or associated with the EOT unit 100), or any other suitable computing device that is associated with or in communication within the verification system 1000. In this preferred and non-limiting embodiment or aspect, the computer is configured, adapted, or programmed to receive or determine pressure data from or associated with the first pressure sensor 102. This pressure data may be in analog or digital form or format, and the either or both of the computer and the first pressure sensor 102 may include the appropriate software, hardware, or firmware to receive, process, determine, convert, and/or provide the pressure data for further use within the system 1000. In addition, this pressure data includes data representing the air pressure in the brake pipe 36 at or near the EOT unit 100 (and/or the last railcar (RC) of the train (TR).

Further, the computer is configured, adapted, or programmed to receive or determine pressure data from or associated with the one or more additional pressure sensors 104. Again, this pressure data may be in analog or digital form or format, and the either or both of the computer and the one or more additional pressure sensors 104 may include the appropriate software, hardware, or firmware to receive, process, determine, convert, and/or provide the pressure data for further use within the system 1000. This pressure data also includes data representing the air pressure in the brake pipe 36 at or near the EOT unit 100 (and/or the last railcar (RC) of the train (TR). As discussed above, the first pressure sensor 102 and the one or more additional pressure sensors 104 can be positioned or obtain air pressure data or information from specified locations along the brake pipe 36.

Next, in this embodiment or aspect, the computer compares at least a portion of the pressure data received or determined (i.e., associated with) the first pressure sensor 102 with at least a portion of the pressure data received or determined (i.e., associated with) the one or more additional pressure sensors 104. Based at least partially upon the results of this comparison, the computer implements, facilitates, and/or causes the implementation or facilitation of at least one action, which will be discussed in various preferred and non-limiting embodiment or aspect hereinafter.

In one preferred and non-limiting embodiment or aspect, the comparison process includes determining variance data, which is the quantitative difference between the pressure data, e.g., the air pressure, received or determined from the first pressure sensor 102 and the pressure data, e.g., the air pressure, received or determined from the additional pressure sensor 104. For example, the variance data may be a determination of the difference between the sensed air pressure by the first pressure sensor 102 and the sensed air pressure by the additional pressure sensor 104. Accordingly, and in one preferred and non-limiting embodiment or aspect, the first pressure sensor 102 and the additional pressure sensor 104 are configured or positioned to sense the air pressure in the brake pipe 36 at the same point or portion of the bake pipe 36. Further, the action that is implemented or facilitated may be dependent on this determined variance data.

In another preferred and non-limiting embodiment or aspect, and based at least partially on the comparison, the action that is implemented or facilitated includes one or more of the following: (a) logging the status of the EOT unit 100 (e.g., an indication of the EOT unit 100 (or any component, e.g., the first pressure sensor 102, the one or more additional pressure sensor 104, etc.) is operable or inoperable, meets or fails to meet a specified condition, is offline or online, exhibits a fault, exhibits a drift condition, and/or the like); (b) logging the EOT unit 100 as requiring maintenance or service (e.g., making a determination that the EOT unit 100 (or any component thereof) requires maintenance or service); (c) logging the EOT unit 100 (or any component thereof) as not requiring maintenance or service (e.g., making a determination that the EOT unit 100 (or any component thereof) is operating as expected, or within acceptable tolerances); (d) communicating a message (e.g., from the EOT computer 106) to the on-board computer 10 of the train (TR), the message including an indication of the status of the EOT unit 100 (or any component thereof); (e) communicating a message to the on-board computer 10 of the train (TR), the message including an indication that the EOT unit 100 (or any component thereof) requires maintenance or service; (f) communicating a message to the on-board computer 10 of the train (TR), the message including an indication that the EOT unit 100 (or any component thereof) does not require maintenance or service; (g) communicating a message to a remote server, such as the central controller 14 (e.g., a back office server, central dispatch, back office PTC components, and/or the like), the message including an indication of the status of the EOT unit 100 (or any component thereof); (h) communicating a message to a remote server, the message including an indication that the EOT unit 100 (or any component thereof) requires maintenance or service; (i) communicating a message to a remote server, the message including an indication that the EOT unit 100 (or any component thereof) does not require maintenance or service; or any combination thereof.

In another preferred and non-limiting embodiment or aspect, the logging and/or communication of the information regarding the status or other conditions associated with the EOT unit 100 (or any component thereof) may occur at some specified rate or time increment. For example, this specified rate may be periodic (e.g., daily, weekly, monthly, etc.), continual or dynamic (e.g., on a substantially continual or ongoing basis), configurable (e.g., at a rate or time increment as set by the manufacturer, the operator, the railroad, a standards organization, a governmental body, etc.), condition based (e.g., based upon the existence or absence of some condition or parameter), at a rate determined by a regulation or standard (e.g., a rate compliant with a regulation, a standard, a governmental body, etc.), or any combination thereof. Therefore, different users or operators can adjust when, how, and how often the status or conditions associated with the EOT unit 100 (or any component thereof) should be checked, logged, communicated, and/or the like. As stated, this rate or time increment can be wholly adjustable and configurable to ensure compliance with the standards, rules, policies, and/or laws of any of the manufacturer, operator, owner, standards organization, governmental body, etc.

In another preferred and non-limiting embodiment or aspect, and as illustrated in FIG. 3, the first pressure sensor 102 and the secondary pressure sensor 104 are in communication (whether wired or wirelessly) with the EOT computer 106, i.e., the local controller, which is in communication with an EOT communication device 108. This EOT communication device 108 may be configured, adapted, or programmed to transmit, process, and/or receive data in wired form (such as over the trainline 28) or wirelessly (such as over a communication link). The communication link can be established, directly or indirectly, with another computer, such as the on-board computer 10, the central controller 14, or some other computing device, e.g., a computer in a remote server, a wayside device, a remote data repository, and/or the like. In particular, and in this embodiment or aspect, the EOT communication device 108 is in communication with the communication device 16 in the locomotive (L) of the train (TR) and/or the central controller 14, e.g., a back office server, central dispatch, back office PTC components, and/or the like. Further, the transmission of data and information may occur indirectly between the EOT communication device 108 and the central controller 14 using the communication device 16 (and/or the on-board computer 10) as the intermediary. Other similar communication paths and links to transmit, process, and receive data and information within the verification system 1000 are also envisioned within the spirit and context of the present invention.

In a further preferred and non-limiting embodiment or aspect, the indication of required maintenance or service that is logged or communicated (or received by the on-board computer 10, central controller 14, or some other remote server or computer) includes or is in the form of one or more of the following: a calibration of the first pressure sensor 102, a calibration of the at least one additional pressure sensor 104, a replacement of the first pressure sensor 102, a replacement of the at least one additional pressure sensor 104, a check of the first pressure sensor 102, a check of the at least one additional pressure sensor 104, or any combination thereof. In particular, the required maintenance or service may call for the calibration of a pressure sensor 102, 104 that has drifted out of calibration, the replacement of a pressure sensor 102, 104 that is broken or has become inoperable, a check or review of a pressure sensor 102, 104 that is exhibiting some variance in operation, and/or a check or review of a pressure sensor 102, 104 based upon some specified schedule or rate.

In another preferred and non-limiting embodiment or aspect, the first pressure sensor 102 and the at least one additional pressure sensor 104 are provided or manufactured by a different manufacturer. Specifically, and by obtaining the pressure sensors 102, 104 from different manufacturers, a more independent and distinct measurement (and comparison) of the pressure in the brake pipe 36 may be obtained. Further, trends or data patterns can be identified between the pressure sensors 102, 104 manufactured or provided by different manufacturers, e.g., differences or variations in pressure measurement drift, differences or variations in failure type or rate, differences or variations in required maintenance type or rate, differences or variations in accuracy, differences or variations in interface parameters with the other components of the EOT unit 100, and/or the like. These differences or variations can be categorized and/or analyzed for use in making purchasing decisions, and may also be used in predicting which EOT units 100 (i.e., which pressure sensors 102, 104 in the EOT unit 100) are more or less likely to require maintenance or replacement.

In a further preferred and non-limiting embodiment or aspect, the first pressure sensor 102 and the at least one additional pressure sensor 104 are provided with or use a different technology to determine the pressure data. By using different technologies in the pressure sensors 102, 104, and as discussed above in connection with the different manufacturers, a more independent and distinct measurement (and comparison) of the pressure in the brake pipe 36 may be obtained. Also, as discussed, trends or data patterns can be identified between the pressure sensors 102, 104 utilizing a different sensing or measuring technology, e.g., differences or variations in pressure measurement drift, differences or variations in failure type or rate, differences or variations in required maintenance type or rate, differences or variations in accuracy, differences or variations in interface parameters with the other components of the EOT unit 100, and/or the like. These differences or variations can be categorized and/or analyzed for use in making purchasing decisions, and may also be used in predicting which EOT units 100 (i.e., which pressure sensors 102, 104 in the EOT unit 100) are more or less likely to require maintenance or replacement.

In another preferred and non-limiting embodiment, the first pressure sensor 102 and the at least one additional pressure sensor 104 are configured or are selected to have or exhibit different responsive or reactive characteristics. These characteristics may include different responses to the effects of internal and/or external temperature, different aging characteristics or parameters, different responses to the effects of vibration, and/or the like. For example, the first pressure sensor 102 and/or the at least one additional pressure sensor 104 may be selected, chosen, or configured such that it reads "higher" as it ages, and the other pressure sensor 102, 104 may be selected, chosen, or configured such that it reads "lower" as it ages. Such an arrangement would minimize or avoid a situation where both pressure sensors 102, 104 drift in the same direction (e.g., both "higher" or both "lower"), which would provide an output where the pressure sensors 102, 104 agree, but the actual measurements are inaccurate.

In another preferred and non-limiting embodiment or aspect, and with reference to FIG. 4, the verification system 1000 may include multiple additional pressure sensors 104. As discussed above, these multiple additional pressure sensors 104 may be located or positioned to sense the air pressure in the brake pipe 36 (preferably at or near the EOT unit 100) in substantially the same, adjacent, aligned, and/or spaced positions or portions of the brake pipe 36. In this embodiment or aspect, the action that may be implemented or facilitated is at least partially based upon a comparison of at least a portion of the pressure data from all of, a set of, and/or specified pressure sensors 102, 104. For example, the selection or identification of the set of or the specified pressure sensors 102, 104 may be configured by the user or operator, may be an automated process, may be manually selected or set on a per EOT unit 100 basis, may be dynamic (e.g., based upon the conditions or status of the pressure sensors 102, 104), and/or the like. Still further, individual additional pressure sensors 104 and/or a group or set of additional pressure sensors 104 may be made by different manufacturers, use a different technology, and/or are configured or are selected to have or exhibit different responsive or reactive characteristics, with all of the benefits discussed above. By using multiple additional pressure sensors 104, a more robust set of pressure data is obtained, and can be used to determine the above-discussed trends and patterns relating to EOT unit 100 (or its components), the pressure sensors 102, 104, the air pressure in the brake pipe 36, and/or the like.

In another preferred and non-limiting embodiment or aspect, the air pressure in the brake pipe 36 at or near the EOT unit 100 is determined based at least partially on the pressure data from the first pressure sensor 102 and the at least one additional pressure sensor 104. Further, in one embodiment or aspect, and as discussed above in connection with FIG. 3, the computer (which is configured, adapted, or programmed to perform at least one of the following steps: (a) receive or determine pressure data from the first pressure sensor 102; (b) receive or determine pressure data from the at least one additional pressure sensor 104; (c) compare at least a portion of the pressure data received or determined from the first pressure sensor 102 with at least a portion of the pressure data received or determined from the at least one additional pressure sensor 104; and/or (d) implement or facilitate at least one action based at least partially upon the results of the comparison) is located on, in, or integrated with the EOT unit 100 (or a component thereof). Further, at least a portion of the pressure data is directly or indirectly communicated to the on-board computer 10 and/or the central controller 14, such as via the EOT communication device 108.

In a further preferred and non-limiting embodiment or aspect, the action that is implemented or facilitated by the computer includes the communication or transmission of at least a portion of the pressure data (and/or information derived from this pressure data, or information derived from the first pressure sensor 102 and/or the at least one additional pressure sensor 104) to another computer or system. For example, the pressure data (or information) may be directly or indirectly communicated by or to the EOT computer 106, the on-board computer 10, the central controller 14, and/or some other remote computer or server (e.g., a monitoring computer system, a data warehouse, a manufacturer computer system, etc.), a train management computer, a remote server, a back office server, central dispatch, and/or the like. Further, this communication may occur directly or indirectly over one or more of the following: a wireless network, rails of a track, a railroad network, a cellular network, a Bluetooth network, a near-field network, a radio network, a portable storage device, and/or the like.

In another preferred and non-limiting embodiment or aspect, the verification system 1000 includes a database (whether local to the train (TR), remote from the train (TR), e.g., at the central controller 14, and/or in any specified remote location or system). This database may be populated with and store one or more of the following: pressure data, variance data, end-of-train unit data, maintenance or service data, calibration data, replacement data, scheduling data, compliance data, railroad data, Federal Railroad Association data, and/or the like. Through the collection and analysis of the pressure data, other data and information can be used to achieve certain additional features. For example, the pressure data, variance data, and/or the end-of-train unit data can be used to determine the need for maintenance, service, replacement, or examination of the EOT unit 100 (or any component thereof) and/or the pressure sensors 102, 104. The pressure data and maintenance or service data can be used to determine the requirement, timing, and/or occurrence of maintenance or service of the EOT unit 100 (or any component thereof) and/or the pressure sensors 102, 104. The pressure data and calibration data can be used to determine whether the pressure sensors 102, 104 require calibration, and the pressure data and replacement data can be used to determine whether the EOT unit 100 (or any component thereof) and/or the pressure sensors 102, 104 require replacement. The pressure data and scheduling data can be used to schedule timing and location of maintenance, service, and/or replacement of the EOT unit 100 (or any component thereof) and/or the pressure sensors 102, 104. The pressure data, compliance data, railroad data, and/or Federal Railroad Association data can be used to determine whether the train (TR), the EOT unit 100 (or any component thereof), and/or the pressure sensors 102, 104 are compliant with the policies or requirements of the operator, the railroad, the manufacturer, the Federal Railroad Association, and/or any other rulemaking, governing, or interested party.

In another preferred and non-limiting embodiment or aspect, the pressure data includes preventative maintenance data. This preventative maintenance data may include drift data (e.g., the "drift" of the accuracy or measurements of the pressure sensors 102, 104), trend data (e.g., how the measurements or accuracy of the measurements of the pressure sensors 102, 104 are trending), limit data (e.g., the accuracy or measurements of the pressure sensors 102, 104 compared to some threshold or limit), tolerance data (e.g., the accuracy or measurements of the pressure sensors 102, 104 with respect to certain specified tolerances), and/or comparison data (e.g., the accuracy or measurements of the pressure sensors 102, 104 as compared to each other).

In this embodiment or aspect, and at least partially based upon at least a portion of the preventative maintenance data, the action that is implemented or facilitated includes one or more of the following: (a) logging the status of the EOT unit 100; (b) logging the EOT unit 100 as requiring preventative maintenance or service; (c) logging the EOT unit 100 as not requiring preventative maintenance or service; (d) communicating a message to the on-board computer 10 of the train (TR), the message including an indication of the status of the EOT unit 100; (e) communicating a message to the on-board computer 10, the message including an indication that the EOT unit 100 requires preventative maintenance or service; (f) communicating a message to the on-board computer 10, the message including an indication that the EOT unit 100 does not require preventative maintenance or service; (g) communicating a message to a remote server, e.g., the central controller 14, the message including an indication of the status of the EOT unit 100; (h) communicating a message to the remote server, the message including an indication that the EOT unit 100 requires preventative maintenance or service; (i) communicating a message to the remote server, the message including an indication that the EOT unit 100 does not require preventative maintenance or service; or any combination thereof. Based upon the preventative maintenance data, maintenance or service can be predictively facilitated or implemented with respect to the EOT unit 100 (or any component thereof) and/or the pressure sensors 102, 104. In this manner, potential failures and issues regarding the EOT unit 100 (or any component thereof) and/or the pressure sensors 102, 104 can be proactively addressed.

In another preferred and non-limiting embodiment, the on-board computer 10 is programmed or configured to generate prediction data based at least partially on at least a portion of the results of the comparison. This prediction data may include or be in the form of a prediction of when the first pressure sensor 102 and/or the at least one additional pressure sensor 104 will require maintenance. In one example, this prediction data is in the form of drift data over time, which would allow the user to take preemptive action with respect to maintaining the pressure sensor 102, 104 prior to a predicted failure point, time, and/or date. In this example, if it is observed that the variance between the pressure sensors 102, 104 was within acceptable limits, but increasing over time, it can be predicted at what point the pressure sensor 102, 104 would be out of compliance. In this manner, preventative maintenance could be performed on the pressure sensor 102, 104 prior to failure.

Figure 5:
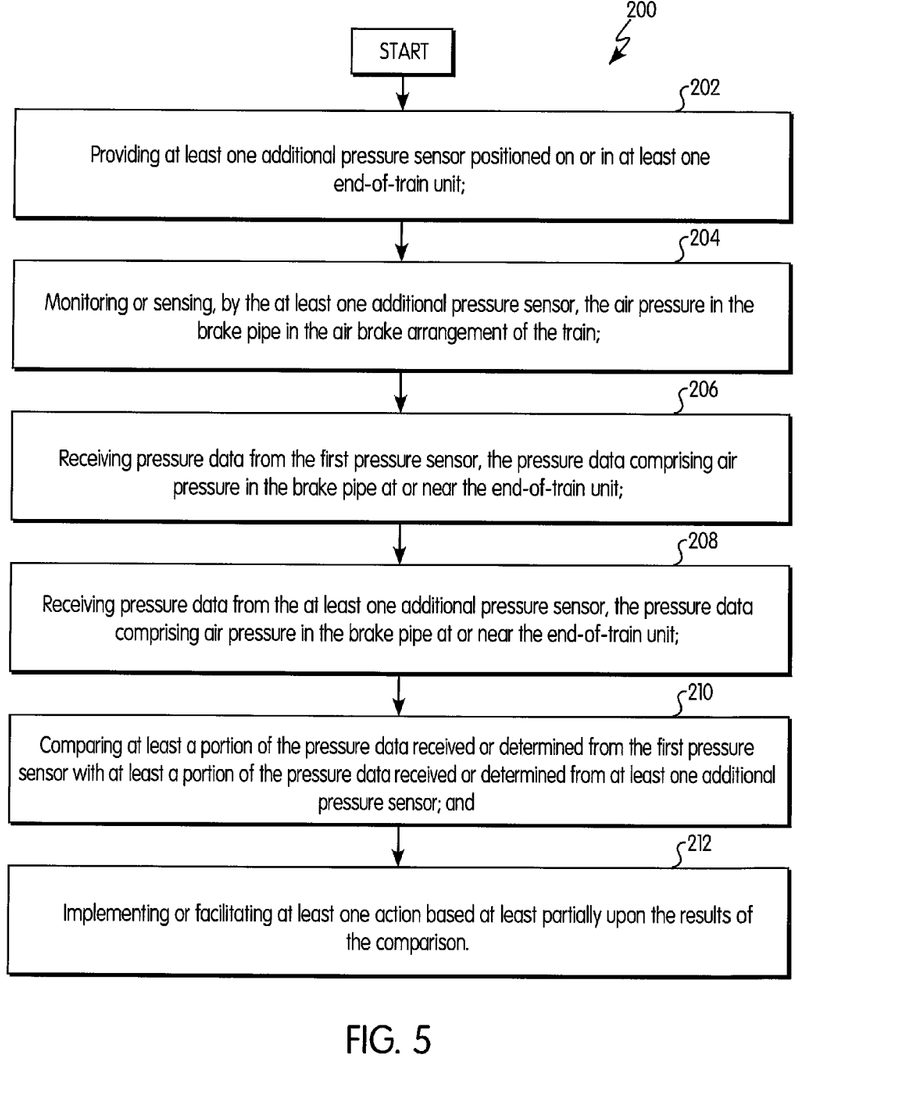
FIG. 5 is a flow diagram of a verification method for an end-of-train unit for a train according to the principles of the present invention.

In a further preferred and non-limiting embodiment or aspect, and as illustrated in FIG. 5, provided is a computer-implemented or facilitated verification method 200 for at least one EOT unit 100 for a train (TR), where the EOT unit includes a first pressure sensor 102 configured, adapted, or programmed to monitor or sense the air pressure in the brake pipe 36 in the air brake arrangement of the train (TR). The method 200 includes: providing at least one additional pressure sensor 104 positioned on or in the EOT unit 100 (Step 202); monitoring or sensing, by the at least one additional pressure sensor 104, the air pressure in the brake pipe 36 in the air brake arrangement of the train (Step 204); receiving pressure data from the first pressure sensor 102, the pressure data including air pressure in the brake pipe 36 at or near the EOT unit 100 (Step 206); receiving pressure data from the at least one additional pressure sensor 104, the pressure data including air pressure in the brake pipe 36 at or near the EOT unit 100 (Step 208); comparing at least a portion of the pressure data received or determined from the first pressure sensor 102 with at least a portion of the pressure data received or determined from the at least one additional pressure sensor 104 (Step 210); and implementing or facilitating at least one action based at least partially upon the results of the comparison (Step 212).

In a still further preferred and non-limiting embodiment or aspect, provided is an end-of-train unit, e.g., EOT unit 100, including: a first pressure sensor 102 configured, adapted, or programmed to monitor or sense the air pressure in the brake pipe 36 in the air brake arrangement of the train (TR); and at least one additional pressure sensor 104 configured, adapted, or programmed to monitor or sense the air pressure in the brake pipe 36 in the air brake arrangement of the train (TR). In this embodiment or aspect, pressure data from the first pressure sensor 102 and the at least one additional pressure sensor 104 is compared, and based at least partially on this comparison, at least one maintenance-related action is implemented or facilitated.

In this manner, an improved verification system 1000 and method for an end-of-train unit, and an improved EOT unit 100 are provided, with particular use in connection with an air brake arrangement of a train. It should be recognized that the above-described functions, algorithms, and determinations may occur on the train (TR), e.g., by the on-board computer 10 or the EOT computer 106, and/or at some remote server, e.g., the central controller 14 or the like. Similarly, some, a portion of, or all of the data generated within the verification system 1000 may be saved locally at the train (TR), e.g., in the track database 12, and/or remotely in some remote system, e.g., in a database associated with a remote server, e.g., the central controller 14 or the like.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A verification system for at least one end-of-train unit for a train, wherein the end-of-train unit comprises a first pressure sensor configured to monitor or sense the air pressure in a brake pipe in an air brake arrangement of the train, the system comprising:
    at least one additional pressure sensor positioned on or in the at least one end-of-train unit and configured to monitor or sense the air pressure in the brake pipe in the air brake arrangement of the train; and
    at least one computer programmed or configured to:
        (a) receive or determine pressure data from the first pressure sensor, the pressure data comprising air pressure in the brake pipe at or near the end-of-train unit;
        (b) receive or determine pressure data from the at least one additional pressure sensor, the pressure data comprising air pressure in the brake pipe at or near the end-of-train unit;
        (c) compare at least a portion of the pressure data received or determined from the first pressure sensor with at least a portion of the pressure data received or determined from the at least one additional pressure sensor; and
        (d) implement or facilitate at least one action based at least partially upon the results of the comparison.

2. The verification system of claim 1, wherein the comparison includes determining variance data comprising the quantitative difference between at least a portion of the pressure data received or determined from the first pressure sensor and at least a portion of the pressure data received or determined from the at least one additional pressure sensor.

3. The verification system of claim 2, wherein the at least one action that is implemented or facilitated is based at least partially on the variance data.

4. The verification system of claim 1, wherein, based at least partially on the comparison, the at least one action that is implemented or facilitated comprises at least one of the following:
    (a) logging the status of the end-of-train unit;
    (b) logging the end-of-train unit as requiring maintenance or service;
    (c) logging the end-of train unit as not requiring maintenance or service;
    (d) communicating a message to an on-board computer of the train, the message including an indication of the status of the end-of-train unit;
    (e) communicating a message to the on-board computer of the train, the message including an indication that the end-of-train unit requires maintenance or service;
    (f) communicating a message to the on-board computer of the train, the message including an indication that the end-of-train unit does not require maintenance or service;
    (g) communicating a message to a remote server, the message including an indication of the status of the end-of-train unit;
    (h) communicating a message to a remote server, the message including an indication that the end-of-train unit requires maintenance or service;
    (i) communicating a message to a remote server, the message including an indication that the end-of-train unit does not require maintenance or service;
    or any combination thereof.

5. The verification system of claim 4, wherein at least one of the logging and communication occurs at a specified rate.

6. The verification system of claim 5, wherein the specified rate is at least one of the following: periodic, continual, dynamic, configurable, condition based, at a rate determined by a regulation or standard, or any combination thereof.

7. The verification system of claim 4, wherein the maintenance or service required is at least one of the following: a calibration of the first pressure sensor, a calibration of the at least one additional pressure sensor, a replacement of the first pressure sensor, a replacement of the at least one additional pressure sensor, a check of the first pressure sensor, a check of the at least one additional pressure sensor, or any combination thereof.

8. The verification system of claim 1, wherein the first pressure sensor and the at least one additional pressure sensor are provided or manufactured by a different manufacturer.

9. The verification system of claim 1, wherein the first pressure sensor and the at least one additional pressure sensor use a different technology to determine the pressure data.

10. The verification system of claim 1, wherein the first pressure sensor and the at least one additional pressure sensor are configured to have different responsive or reactive characteristics with respect to at least one of the following: temperature, age, vibration, or any combination thereof.

11. The verification system of claim 1, wherein the at least one additional pressure sensor comprises a plurality of additional pressure sensors.

12. The verification system of claim 11, wherein the at least one action that is implemented or facilitated is at least partially based upon a comparison of at least a portion of the pressure data from all of, a set of, and/or specified pressure sensors.

13. The verification system of claim 12, wherein identification of the set of or the specified pressure sensors is at least one of the following: configurable, automated, manually input, dynamic, or any combination thereof.

14. The verification system of claim 11, wherein each of the first pressure sensor and the plurality of additional pressure sensors are provided or manufactured by a different manufacturer.

15. The verification system of claim 11, wherein each of the first pressure sensor and the plurality of additional pressure sensors use a different technology to determine the pressure data.

16. The verification system of claim 11, wherein each of the first pressure sensor and the plurality of additional pressure sensors are configured to have different responsive or reactive characteristics with respect to at least one of the following: temperature, age, vibration, or any combination thereof.

17. The verification system of claim 1, wherein the air pressure in the brake pipe at or near the end-of-train unit is determined based at least partially on the pressure data from the first pressure sensor and the at least one additional pressure sensor.

18. The verification system of claim 17, wherein the at least one computer is located on or in the at least one end-of-train unit, and wherein the at least a portion of the pressure data is communicated to at least one of an on-board computer of the train and a remote server.

19. The verification system of claim 1, wherein the at least one action that is implemented or facilitated comprises communication of at least a portion of the pressure data, or information derived from at least a portion of the pressure data, to at least one of the following: an on-board computer, an on-board controller, a train management computer, a remote server, a back office server, central dispatch, or any combination thereof, over at least one of the following: a wireless network, rails of a track, a railroad network, a cellular network, a Bluetooth network, a near-field network, a radio network, a portable storage device, or any combination thereof.

20. The verification system of claim 1, further comprising populating a database with at least one of the following: pressure data, variance data, end-of-train unit data, maintenance or service data, calibration data, replacement data, scheduling data, compliance data, railroad data, Federal Railroad Association data, or any combination thereof.

21. The verification system of claim 1, wherein the pressure data comprises preventative maintenance data comprising at least one of the following: drift data, trend data, limit data, tolerance data, comparison data, or any combination thereof.

22. The verification system of claim 21, wherein, at least partially based upon at least a portion of the preventative maintenance data, the at least one action that is implemented or facilitated comprises at least one of the following:
(a) logging the status of the end-of-train unit;
(b) logging the end-of-train unit as requiring preventative maintenance or service;
(c) logging the end-of-train unit as not requiring preventative maintenance or service;
(d) communicating a message to an on-board computer of the train, the message including an indication of the status of the end-of-train unit;
(e) communicating a message to the on-board computer of the train, the message including an indication that the end-of-train unit requires preventative maintenance or service;
(f) communicating a message to the on-board computer of the train, the message including an indication that the end-of-train unit does not require preventative maintenance or service;
(g) communicating a message to a remote server, the message including an indication of the status of the end-of-train unit;
(h) communicating a message to a remote server, the message including an indication that the end-of-train unit requires preventative maintenance or service;
(i) communicating a message to a remote server, the message including an indication that the end-of-train unit does not require preventative maintenance or service;
or any combination thereof.

23. The verification system of claim 1, wherein the at least one computer is further programmed or configured to generate prediction data based at least partially on at least a portion of the results of the comparison.

24. The verification system of claim 23, wherein the prediction data comprises a prediction of when the first pressure sensor and/or the at least one second pressure sensor will require maintenance.

25. A computer-implemented or facilitated verification method for at least one end-of-train unit for a train, wherein the end-of-train unit comprises a first pressure sensor configured to monitor or sense the air pressure in a brake pipe in an air brake arrangement of the train, the method comprising:
providing at least one additional pressure sensor positioned on or in the at least one end-of-train unit;
monitoring or sensing, by the at least one additional pressure sensor, the air pressure in the brake pipe in the air brake arrangement of the train;
receiving pressure data from the first pressure sensor, the pressure data comprising air pressure in the brake pipe at or near the end-of-train unit;
receiving pressure data from the at least one additional pressure sensor, the pressure data comprising air pressure in the brake pipe at or near the end-of-train unit;
comparing at least a portion of the pressure data received or determined from the first pressure sensor with at least a portion of the pressure data received or determined from the at least one additional pressure sensor; and
implementing or facilitating at least one action based at least partially upon the results of the comparison.

* * * * *